United States Patent [19]
Modi et al.

[11] Patent Number: 6,125,345
[45] Date of Patent: Sep. 26, 2000

[54] METHOD AND APPARATUS FOR DISCRIMINATIVE UTTERANCE VERIFICATION USING MULTIPLE CONFIDENCE MEASURES

[75] Inventors: Piyush C. Modi, Flemington; Mazin G. Rahim, Matawan, both of N.J.

[73] Assignee: AT&T Corporation, New York, N.Y.

[21] Appl. No.: 08/934,056

[22] Filed: Sep. 19, 1997

[51] Int. Cl.$^7$ .............................. G10L 5/06; G10L 9/00
[52] U.S. Cl. ..................... 704/240; 704/246; 704/236; 704/232
[58] Field of Search ................................. 704/240, 236, 704/232

[56] References Cited

U.S. PATENT DOCUMENTS

| | | | |
|---|---|---|---|
| 5,317,673 | 5/1994 | Cohen | 704/232 |
| 5,710,866 | 1/1998 | Alleva | 704/256 |
| 5,799,276 | 8/1998 | Komissarchik | 704/251 |

OTHER PUBLICATIONS

"String–based minimum verification error (SB–MVE) training for speech recognition", Mazin G. Rahim et al., Computer Speech and Language (1997) 11, 147–160.

"A Training Procedure for Verifying String Hypotheses in Continuous Speech Recognition", R.C. Rose et al., Inter. Conf. On Acoust. Speech and Signal Proc., Detroit, May 1995.

Utterance Verification of Keywork Strings Using Word-–Based Minimum Verification Error (WB–MVE) Training, Rafid A. Sukkar, et al., AT&T Bell Laboratories, Proceedings ICSLP, pp. 602–605, 1996.

"Discriminative Utterance Verification for Connected Digits Recognition", Mazin G. Rahim, et al., IEEE Transactions on Speech and Audio Processing, vol. 5. No. 3, May 1997.

"Minimum Classification Error Rate Methods for Speech Recognition", Biing–Hwang Juang, et al., IEEE Transactions on Speech and Audio Processing, vol. 5, No. 3, May 1997.

"An Introduction to Computing with Neural Nets", Richard P. Lippmann, IEEE ASSP Magazine, pp. 4–22, Apr. 1987.

Primary Examiner—Krista Zele
Assistant Examiner—Robert Sax
Attorney, Agent, or Firm—Oliff & Berridge, PLC

[57] ABSTRACT

A multiple confidence measures subsystem of an automated speech recognition system allows otherwise independent confidence measures to be integrated and used for both training and testing on a consistent basis. Speech to be recognized is input to a speech recognizer and a recognition verifier of the multiple confidence measures subsystem. The speech recognizer generates one or more confidence measures. The speech recognizer preferably generates a misclassification error (MCE) distance as one of the confidence measures. The recognized speech output by the speech recognizer is input to the recognition verifier, which outputs one or more confidence measures. The recognition verifier preferably outputs a misverification error (MVE) distance as one of the confidence measures. The confidence measures output by the speech recognizer and the recognition verifier are normalized and then input to an integrator. The integrator integrates the various confidence measures during both a training phase for the hidden Markov models implemented in the speech recognizer and the recognition verifier and during testing of the input speech. The integrator is preferably implemented using a multi-layer perceptron (MLP). The output of the integrator, rather than the recognition verifier, determines whether the recognized utterance hypothesis generated by the speech recognizer should be accepted or rejected.

23 Claims, 6 Drawing Sheets

METHOD AND APPARATUS FOR DISCRIMINATIVE UTTERANCE VERIFICATION USING MULTIPLE CONFIDENCE MEASURES

BACKGROUND OF THE INVENTION

1. Field of Invention

This invention is directed to automated speech recognition systems. In particular, this invention is directed to a method and an apparatus for classifying and verifying recognition hypotheses of speech input to the automated speech recognition system. More particularly, this invention is directed to a system which uses multiple confidence measures in an integrated classification and verification subsystem.

2. Description of Related Art

Figure 1:
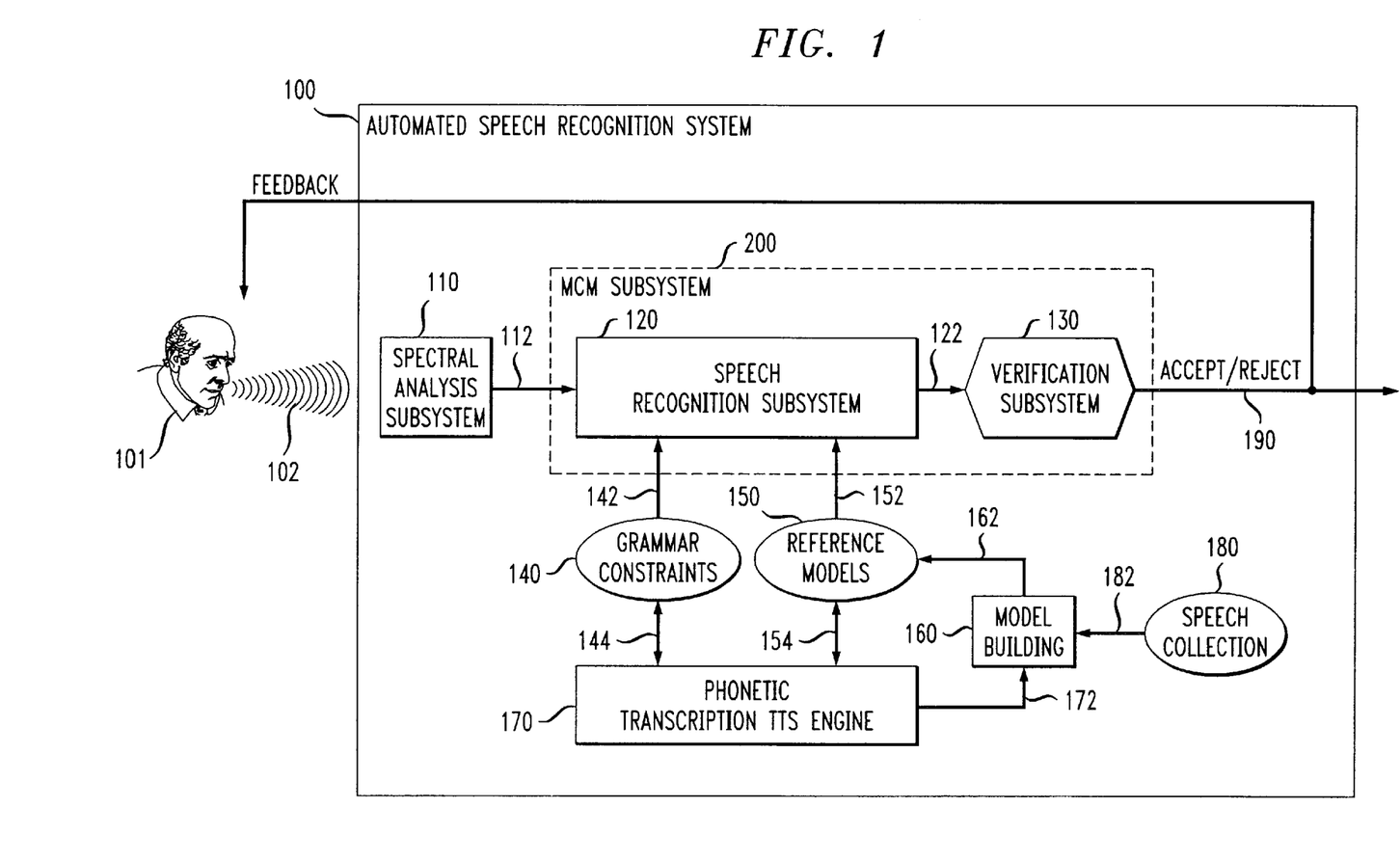
FIG. 1 is a block diagram of an automated speech recognition system.

Flexible and robust automated speech recognition systems have long been sought. As shown in FIG. 1, the current paradigm for automated speech recognition systems is to convert spoken words into spectral coefficients and then input those spectral coefficients into a speech recognition subsystem that generates recognition hypotheses. The recognition hypotheses are generated based on some arbitrarily selected confidence measure (CM) so that the speech recognition subsystem outputs as the recognized unit of speech the recognition hypothesis which most closely matches the criteria of the confidence measure. The recognized unit of speech can be a phoneme, a string or a word or the like. The recognition hypothesis output by the speech recognition subsystem is input to a verification subsystem, which attempts to verify that the recognition hypothesis output by the speech recognition subsystem for the current set of spectral coefficients is correct.

In particular, hidden Markov models (HMMs) have been used to implement the speech recognition and verification subsystems. HMMs have allowed speech recognition systems to accommodate spontaneous speech input. Although this capability facilitates a friendlier user interface, it also poses a number of problems, including out-of-vocabulary words, false starts, disfluency, and acoustical mismatch. Thus, automated speech recognition systems must be able to detect and recognize "keywords", i.e., the words of the vocabulary of the automated speech system, while rejecting "non-keywords." In general, automated speech recognition systems have limited vocabularies, such as digits and/or user-added names in an automated voice dialing system.

Automated speech recognition (ASR) systems that are able to spot keywords allow users the flexibility to speak naturally without needing to follow a rigid speaking format. Utterance verification (UV) technology is desirable in such automated speech recognition systems. As described in B.-H. Juang, et al., "Minimum Classification Error Rate Methods for Speech Recognition," IEEE Transactions on Speech and Audio Processing, Vol. 5, No. 3, May 1997, pages 257–265 (Juang) (herein incorporated by reference in its entirety) and M.G. Rahim, et al., "Discriminative Utterance Verification for Connected Digits Recognition," IEEE Transactions on Speech and Audio Processing, Vol. 5, No. 3, May 1997, pages 266–277 (Rahim 1) (herein incorporated by reference in its entirety), significant progress has been made in utterance verification (UV) for unconstrained speech using HMMs. Utterance verification (UV) systems introduce a filler (or garbage) model for enhancing keyword detection and absorbing out-of-vocabulary speech. Filler HMMs also allow the false alarm rate (i.e., the false positive or erroneously verified keyword rate) to be reduced through keyword verification following detection and segmentation of speech into keyword hypotheses by the speech recognition subsystem.

As described in Juang, HMM-based speech recognition can be efficiently implemented using a minimum classification error (MCE) training method that minimizes either the empirical error rate or the expected error rate, given an arbitrary choice of the distribution (discriminant) function, rather than the traditional maximum likelihood (ML) method that is based on the distribution estimation formulation. One problem when using HMMs is the evaluation problem. Given an observation sequence (or a set of sequences) X, the estimation problem involves finding the "right" model parameter values that specify a source model most likely to produce the given sequence of observations.

The MCE approach to solving the estimation problem involves finding a set of parameters $\Lambda$ that minimize a predetermined loss measure, such as the expected loss or the empirical loss. Various minimization algorithms, such as the generalized probabilistic descent (GPD) algorithm, can be used to minimize the expected loss. In the GPD-based minimization algorithm, the expected loss is minimized according to an iterative procedure. However, the underlying probability distributions involved in minimizing the expected loss are often unknown. However, MCE is designed only to minimize the recognition error, and is not generally concerned with utterance verification.

In the MCE training method, an utterance observation X is assumed to be one of M classes. For recognition of continuous speech or for speech recognition using subword model units, X is usually a concatenated string of observations belonging to different classes. For example, a sentence is a sequence of words, each of which are to be modeled by a distribution. In this situation, one possible training criterion is to minimize the string error rate of the string models constructed from concatenating a set of word or substring models. A MCE-trained HMM generates a word sequence label W for an observation sequence X that minimizes the classification error rate.

Once the speech recognition system has nominally recognized the observation sequence and generated a word sequence for the observation sequence, utterance verification attempts to reject or accept part or all of a nominally recognized utterance based on a computed confidence score. Utterance verification also attempts to reject erroneous but valid keyword strings (i.e., "putative errors"). Utterance verification is particularly useful in situations where utterances are spoken without valid keywords, or when significant confusion exists among keywords, thus resulting in a high substitution error probability.

To deal with these types of problems, automated speech recognition systems must be able to both correctly recognize keywords embedded in extraneous speech and to reject utterances that do not contain valid keywords or keyword hypotheses that have low confidence scores. Rahim 1 describes a HMM-based verification subsystem that computes a confidence measure that determines whether or not to reject recognized strings. Rahim's verification method and apparatus tests a "null" hypothesis that a given keyword or set of keywords exist within a segment of speech and are correctly recognized against alternative hypotheses that the given keyword or set of keywords does not exist or is incorrectly classified within that speech segment. In Rahim 1, the MCE training method is used to train the HMM-based verification subsystem.

In the HMM-based verification subsystem described in R. A. Sukkar, et al., "Utterance Verification of Keyword Strings Using Word-Based Minimum Verification Error (WB-MVE) Training", Proceedings of the International Conference on Acoustics, Speech and Signal Processing, IEEE, Piscataway, N.J. (1996) (Sukkar) (herein incorporated by reference in its entirety) and M. G. Rahim, et al., "String-Based Minimum Verification Error (SB-MVE) Training for Speech Recognition", *Computer Speech and Language* (1997) 11, pages 147–160, Academic Press, Ltd. (Rahim 2) (herein incorporated by reference in its entirety), the HMMs are trained using a minimum verification error (MVE) training method rather than the minimum classification error (MCE) training method.

Although MCE training reduces the recognition error rate as well as the verification error rate, the objective function used in recognition training is not consistent with that for utterance verification training. In contrast to MCE, in minimum verification error (MVE) training, a misverification measure is used to minimize the expected verification error rates, thus reducing the combined false alarm rate and the false rejection (i.e., false negative) rate. In particular, MVE is used to adapt the parameters of the verification HMMs.

Figure 2:
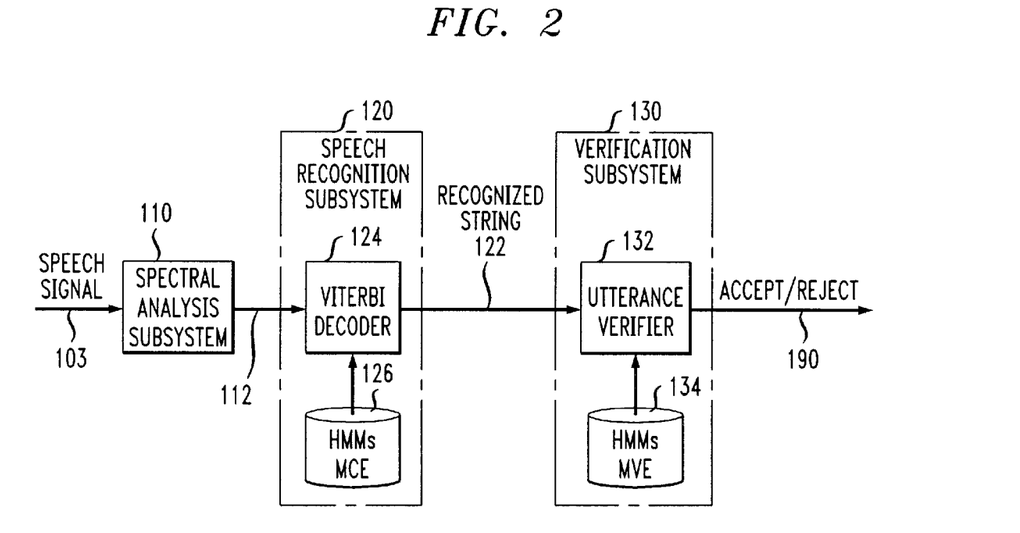
FIG. 2 is a block diagram showing conventional speech recognition and verification subsystems in greater detail.

FIG. 2 shows, in greater detail, a basic architecture of the two-stage system shown in FIG. 1. In the first stage, recognition is performed via Viterbi beam search using a set of recognition HMMs 126. These recognition HMMs 126 are trained by adjusting the parameters Λ of the recognition HMMs 126 using maximum likelihood estimation followed by string-based minimum classification error (MCE) training. During recognition, each utterance is segmented into keyword hypotheses and is then passed to the verification subsystem 130.

In the second stage, each keyword hypothesis is verified using a set of verification HMMs 134. These verification HMMs 134 are initially trained using maximum likelihood estimation followed by string-based minimum verification error (MVE) training. During verification, a hypothesis is tested over the entire utterance, resulting in a confidence score. The utterance is rejected if the confidence score is below a predetermined operating test threshold. The verification HMMs 134 include keyword models, which model correctly recognized keywords, anti-keyword models, which correspond to incorrect recognition of one keyword as another keyword, and a filler model, which corresponds to out-of-vocabulary words.

However, while confidence measures, such as MCE and MVE, have reduced the error rates of the recognition and verification subsystems, respectively, each of these confidence measures are implemented independently of each other. Thus, there is no consistent way to combine the various confidence measures, whether in training the HMMs or in testing the input speech. Even when the various confidence measures have been combined, they have only been combined on an ad hoc basis for the particular use to which the automated speech recognition system was to be put, and then only for testing the input speech, not for training the HMMs.

However, even with discriminative (i.e., MCE and MVE) training techniques, the likelihood ratio test used for UV cannot be made most optimal. That is, due to assumptions made regarding the hypotheses' probability density functions and the inability to estimate, for each hypotheses, the probability density function's parameters exactly, the likelihood ratio test used for discriminative (i.e., MCE and MVE) training techniques is not guaranteed to be the most powerful test for UV.

SUMMARY OF THE INVENTION

The multiple confidence measure subsystem of this invention thus provides a method and apparatus which use confidence measures available from a variety of different and complementary knowledge sources derivable from the ASR system, such as spoken utterances, language models, acoustic models and the like. In addition, other modalities (such as visual cues) can be used effectively by integrating their confidence measures in the multiple confidence measure subsystem of this invention to reduce verification errors.

The multiple confidence measure subsystem of this invention thus provides a combined recognition and verification subsystem which consistently combines two or more confidence measures both for training the hidden Markov models and the integrator and for testing the spoken utterance.

The confidence measures of this invention are preferably obtained from different knowledge sources available during the ASR process, such as likelihood scores, likelihood ratio statistics, duration statistics, and other task-specific information derivable from the ASR system.

The confidence measures of this invention are preferably formulated at any of the string, word, phone or state levels.

The combined confidence measures subsystem of this invention includes an integration subsystem to optimally combine the various confidence measures, resulting in fewer verification errors.

The integration subsystem of this invention preferably includes a multi-layer neural network, which is preferably a multi-layer perceptron.

The integration subsystem of this invention preferably uses the same integration function as a loss function during training of the parameters of the knowledge source subsystems and the integration subsystem.

These and other features and advantages of this invention are described in, or are apparent from, the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

FIG. 1 shows a preferred embodiment of an automated speech recognition system 100. As a speaker 101 speaks, the speaker 101 generates sound waves 102, which are picked up by a microphone (not shown) of the automated speech recognition system 100 and converted into an electrical signal. The electrical signal is input into a spectral analysis subsystem 110. The spectral analysis subsystem 110 preferably converts the electrical signal generated by the microphone into a feature vector. The feature vector preferably includes 39 parameters, including 12 linear predictive coding (LPC)-derived cepstral coefficients, 12 delta cepstral coefficients, 12 delta-delta cepstral coefficients, normalized log energy, delta normalized log energy, and delta-delta normalized log energy. The 39-parameter feature vector is then input over a signal line 112 to a speech recognition subsystem 120.

Conventionally, the speech recognition subsystem 120 is implemented using Viterbi decoding via hidden Markov models (HMMs). The recognition hypotheses are generated based on grammar constraints 140 and reference models 150 which are accessed by the speech recognition subsystem 120 over the signal lines 142 and 152, respectively. The recognition hypotheses generated by the speech recognition subsystem 120 are output over the signal line 122 to the verification subsystem 130.

Conventionally, the verification subsystem 130 includes one keyword HMM for each of the n keywords to be recognized, one anti-keyword HMM for each keyword, a filler HMM that represents out-of-vocabulary words, and a background/silence HMM that represents background noise and silence between spoken words. The verification subsystem 130 determines whether the recognition hypotheses generated by the speech recognition subsystem 120 are correct. If so, the recognition hypotheses generated by the speech recognition subsystem 120 are accepted. Otherwise, they are rejected. The accepted or rejected recognition hypotheses are output from the verification subsystem 130 over a signal line 190. If these recognition hypotheses generated by the speech recognition subsystem 120 are rejected, the speaker 101 is notified so that the rejected portion of speech can be repeated. Alternatively, the ASR system can perform some self-correction, such as reallocating computing and memory resources to the ASR task, so that a more accurate recognition procedure can be reapplied to the misrecognized utterance, or obtaining additional information from an application or user database for performing a more accurate recognition procedure on the misrecognized utterance.

As shown in FIG. 1, the automated speech recognition system 100 uses the grammar constraints 140 and the reference models 152 to generate the recognition hypotheses. A phonetic transcription TTS engine 170 is used to build the grammar constraints 140 via a signal line 144 and also controls a model building subsystem 160 via a control line 172. Furthermore, the phonetic transcription TTS engine 170 directly interacts with the reference models 150 over a signal line 154. The model building subsystem 160 interacts with a speech collection 180 via a signal line 182 to build the reference models 150 via a signal line 162.

FIG. 2 shows a conventional speech recognition subsystem 120 and a conventional verification subsystem 130 in greater detail. After the speech signal 103 from the microphone is input to the spectral analysis subsystem 110, and the spectral coefficients are output over the signal line 112, they are input to the speech recognition system 120. The speech recognition subsystem 120 includes a Viterbi decoder 124 and a number of recognition HMMs 126. The recognition HMMs 126 have been trained via MCE.

The Viterbi decoder 124 inputs the spectral coefficients from the spectral analysis subsystem 110, and via the HMMs 126, outputs a recognized utterance over the signal line 122 to the verification subsystem 130.

The verification subsystem 130 includes an utterance verifier 132 and a number of verification HMMs 134. The verification HMMs 134 have been trained via MVE. The utterance verifier 132 inputs the recognized utterance input over the signal line 122 from the Viterbi decoder 124 and, via the verification HMMs 134, outputs a confidence measure over the signal line 190. The confidence measure indicates whether the recognized utterance should be accepted or rejected, in whole or in part.

The HMMs 126 and 134 are trained via discriminative training to estimate the parameters of the hypotheses test to minimize test errors in the training data. The MCE and MVE discriminant functions are formulated based on the generalized probabilistic descent (GPD) algorithm. The minimum classification error (MCE) training is used to train the recognition HMMs 126 to minimize the classification error rate over the training data. The minimum verification error (MVE) training is used to train the verification HMMs 134 to minimize the verification error rate over the training data.

Both MCE and MVE training can be either string-based or word-based. When the training is string-based, the GPD algorithm is applied at the string level. In this case, three types of error, insertions, deletions, and substitutions, can be used to train the HMMs 126 and 134. In word-based training, the GPD algorithm is applied at the word level. In this case, only substitutions, and perhaps insertions, can be considered and used when training the HMMs 126 and 134.

When training the recognition HMMs 126, the parameters $\Lambda^{(1)}$ of the set of recognition HMMs 126 are adjusted using an available set of training data. In MCE training, the parameters are adjusted to minimize the expected loss function:

$$E[S\{d_i^{(MCE)}(O;\Lambda^{(1)})\}], \quad (1)$$

where:

S is a sigmoid function; and $d_i(O;\Lambda^{(1)})$ is a misclassification measure for utterance i. Preferably, $d_i^{(MCE)}$ is defined as:

$$d_i^{(MCE)} = d_i^{(1)}(O;\Lambda^{(1)}) \quad (2)$$
$$= -g_i(O;\Lambda^{(1)}) + G_i(O;\Lambda^{(1)}),$$

where:

$g_i(O;\Lambda^{(1)})$ is the discriminant function for the correct class $C_i$ for utterance i; and $G_i(O;\Lambda^{(1)})$ is the anti-discriminant function.

When training the verification HMMs 134, the parameters $\Lambda^{(2)}$ of the verification HMMs 134 are adjusted using some available set of training data. When training the verification HMMs 134, the parameters $\Lambda^{(2)}$ are adjusted to minimize the expected smooth loss function:

$$E[S\{d_i^{(MVE)}(O;\Lambda^{(2)})\}], \quad (3)$$

where:

S is a sigmoid function; and $d_i^{(MVE)}$ is a misverification measure for utterance i.

Preferably, $d_i^{(MVE)}$ is defined as:

$$d_i^{(MVE)} = d_i^{(2)}(O; \Lambda^{(2)}) \qquad (4)$$
$$= -s_i(O; \Lambda^{(2)}) + S_i(O; \Lambda^{(2)}),$$

where:

$S_i(O; \Lambda^{(2)})$ is the confidence measure for the correct class $C_i$ for utterance i; and $S_i(O; \Lambda^{(2)})$ is a confidence measure for the competing classes to the correct class $C_i$. In a preferred embodiment, $S_i$ is the geometric mean of the competing classes, but can be any metric determined from the competing classes.

The confidence measure $s_i$ for the correct class $C_i$ is preferably:

$$s_i(O; \Lambda^{(2)}) = \log\left[(1/N(i))\sum_{q=1}^{N(i)} \exp(\kappa L_{R_i(q)}(O_q; \Lambda^{(2)}))\right]^{1/\kappa} \qquad (5)$$

where:

N (i) is the number of keywords for the correct class $C_i$;

k is a negative constant;

$O_q$ is the speech segment for the $q^{th}$ word; and $L_R(.)$ is a likelihood ratio computed from the verification HMMs 134, i.e., based on the keywords, anti-keywords and filler.

The full derivations for the minimum classification error training and the minimum verification error training are set forth in Rahim 2, and thus are not discussed further.

Figure 3:
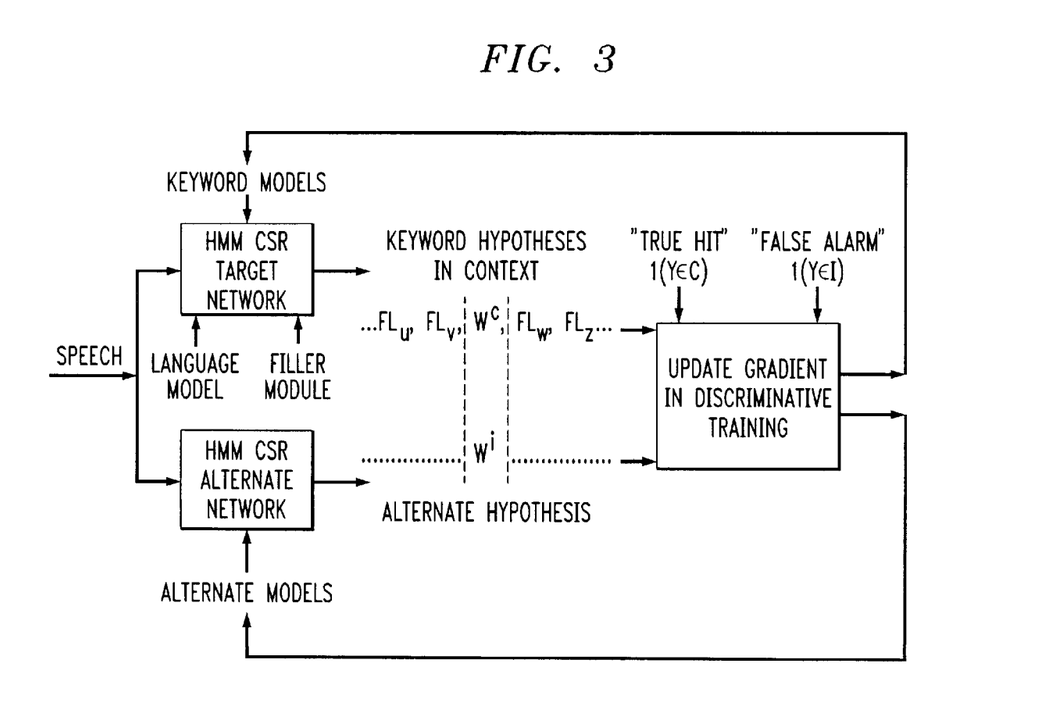
FIG. 3 is a block diagram illustrating a gradient descent-based training procedure that results in improved performance when verifying hypothesized vocabulary words decoded in continuous utterances.

FIG. 3 shows a block diagram outlining a conventional gradient descent-based training procedure for verifying hypothesized vocabulary words decoded in continuous utterances. As shown in FIG. 3, the training procedure for the verification HMMs 134 is completely independent of the training procedure for the recognition HMMs 126.

Figure 4:
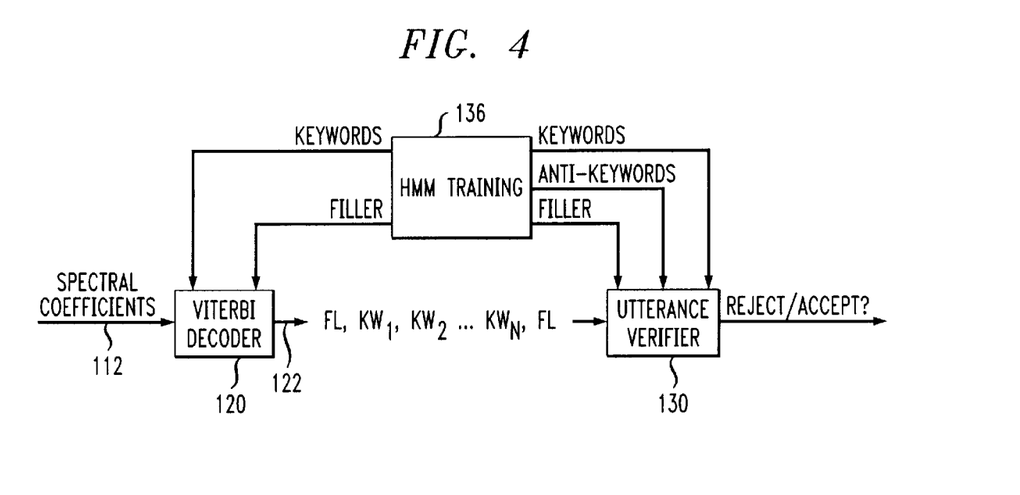
FIG. 4 is a block diagram of a training/recognition/verification system using MCE training for the recognition subsystem and MVE training for the verification subsystem.

FIG. 4 shows another conventional training procedure for training the recognition HMMs 126 and the verification HMMs 134. In the training procedure shown in FIG. 4, while the recognition HMMs 126 and the verification HMMs 134 are trained using a single HMM training procedure 136, this training procedure 136 uses only MCE training. As discussed above, while using MCE training will reduce the recognition error rate as well as the verification error rate, MCE training is directed to minimizing classification errors, which is inconsistent with the verification errors generated by the verification HMMs 134.

Figure 5:
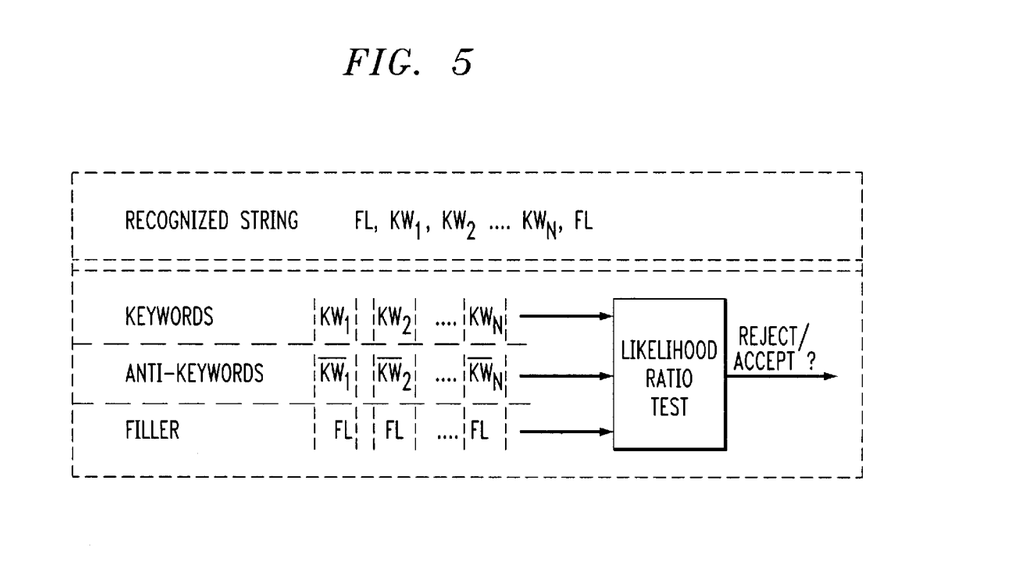
FIG. 5 is a schematic diagram of the verification subsystem of FIG. 4 during testing.

Regardless of the conventional procedure used to train the recognition HMMs 126 and the verification HMMs 134, in operation, the conventional verification subsystem 130 of the automated speech recognition system 100 uses the verification procedure shown in FIG. 5 to determine whether the recognized utterance:

"FL $KW_1$ $KW_2$ . . . $KW_n$ FL", (6)

where:

FL represents a recognition hypothesis that a portion of the utterance is a filler utterance; and $KW_1$–$KW_n$ are recognition hypotheses that a portion of the utterances are keywords utterances; should be accepted or rejected. As described in the incorporated references, the likelihood ratio test determines if the likelihood ratio $L_R$ is above or below a verification threshold $\tau_k$. The likelihood ratio $L_R$ tests a null hypothesis, i.e., the hypothesis that a given keyword exists in a segment of speech, against an alternative hypothesis, i.e., that the given keyword does not exist within the speech segment. That is, when testing a keyword hypothesis k, a segment of speech O is accepted if:

$$L_R(O)=p_i(O|H_0)/p_i(O|H_1) \geq \tau_k \qquad (7)$$

where:

$p_i(O|H_0)$ is the probability density function of the null hypothesis; and $p_i(O|H_1)$ is the probability density function of the alternative hypotheses.

When dealing with HMM-based speech recognition subsystems and verification subsystems, the probability density functions of the null and alternative hypotheses are not known exactly. Accordingly, the likelihood ratio test is no longer guaranteed to be the optimal test nor is it ensured to maximally separate the null and alternative hypotheses. As described above, training the recognition HMMs 126 and the verification HMMs 134 using MCE improves the performance of both the speech recognition subsystem 120 and the verification subsystem 130. Similarly, performance of the verification subsystem 130 can be improved by training the verification HMMs 134 using MVE.

However, even with discriminative (i.e., MCE and MVE) training techniques, the likelihood ratio test used for UV cannot be made most optimal. That is, due to assumptions made regarding the hypotheses' probability density functions and the inability to estimate, for each hypotheses, the probability density function's parameters exactly, the likelihood ratio test used for discriminative (i.e., MCE and MVE) training techniques is not guaranteed to be the most powerful test for UV.

The multiple confidence measure subsystem thus integrates confidence measures available from a variety of different and complementary knowledge sources derivable from the ASR system, such as spoken utterance, language models, acoustic models and the like to improve the performance of utterance verification. In addition, other modalities (such as visual cues) can be used effectively by integrating their confidence measures in the multiple confidence measure subsystem to improve the performance of utterance verification.

The multiple confidence measure subsystem thus uses the confidence measures generated by the recognition and verification subsystems, and consistently combines these confidence measures both for training the hidden Markov models and the integrator and for verifying the recognition hypotheses generated by the recognition subsystem for the spoken utterances.

The confidence measures of this invention are preferably obtained from different knowledge sources available during the ASR process, such as likelihood scores, likelihood ratio statistics, duration statistics, and other task-specific information derivable from the ASR system.

Figure 6:
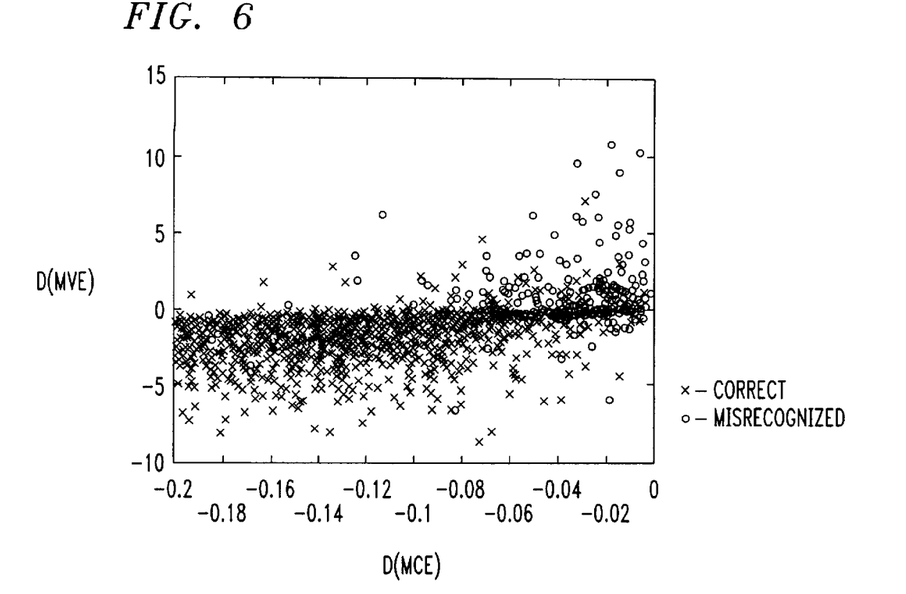
FIG. 6 is a graph showing a scatter diagram between MCE- and MVE-based confidence measures when faced with correctly recognized utterances and misrecognized utterances.

FIG. 6 shows a scatter diagram plotting two confidence measures for the correctly recognized speech input, shown as an "x", and for the misrecognized speech input, shown as an "o". As shown in FIG. 6, the two classes are not linearly separable. Thus, the two confidence measures cannot be combined using a linear Fisher discriminator, as has been proposed in A. Setlur, et al., "Correcting Recognition Errors Via Discriminative Utterance Verification", Proceedings ICSLP, pages 602–605, 1996 (herein incorporated by reference in its entirety).

Figure 7:
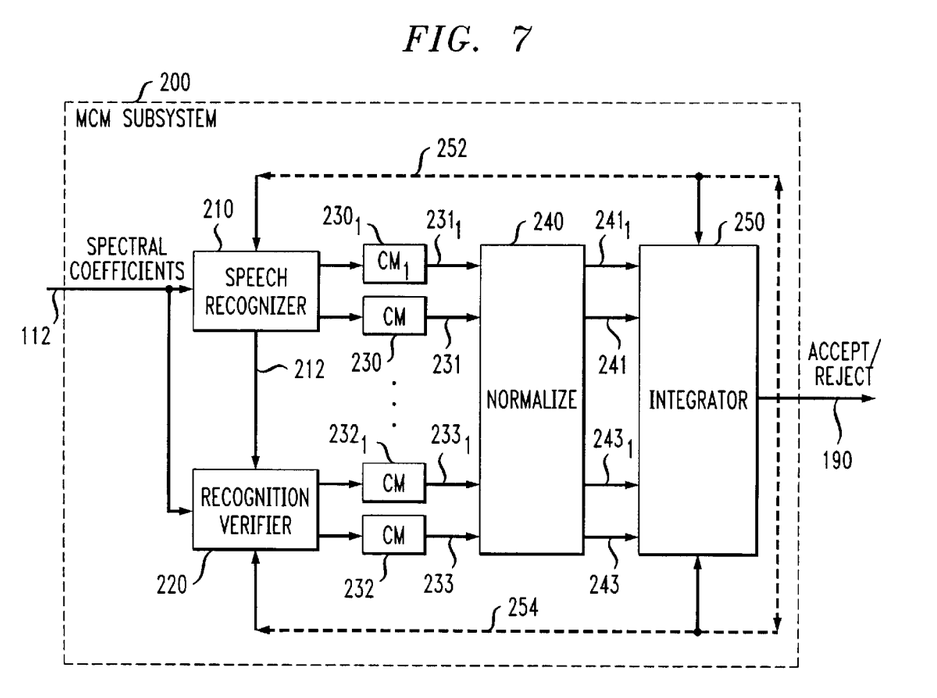
FIG. 7 is a block diagram of the multiple confidence measures subsystem of this invention.

Thus, according to this invention, and as shown in FIG. 1, the conventional speech recognition subsystem 120 and the conventional verification subsystem 130 are replaced with a multi-confidence measure subsystem 200 shown in FIG. 7. As shown in FIG. 7, the MCM subsystem 200 inputs the spectral coefficients over the signal line 112 from the spectral analysis subsystem 110. The spectral coefficients are input in parallel to a speech recognizer 210 and a recognition verifier 220. The speech recognizer 210 outputs at least one confidence measure $230_1$ and can output up to J confidence measures $230_1$–$230_j$. These confidence measures are output on the signal lines $231_1$–$231_j$ to a normalizer 240. The recognized string of utterances, whether string-based or word-based, are output over a signal line 212 to the recognition verifier 220. The recognition verifier 220 also outputs at least one confidence measure $232_1$ and can output up to M confidence measures $231_1$–$232_m$. The M confidence measures are output on the signal lines $233_1$–$233_m$ to the normalizer 240.

In the preferred embodiment, the speech recognizer 210 includes a set of MCE-trained HMMs and outputs the misclassification error confidence measure $d_i^{(MCE)}$ as the confidence measure $230_1$ on the signal line $231_1$ to the normalizer 240. The recognition verifier 220 preferably includes a set of MVE-trained HMMs and outputs the misverification error confidence measure $d_i^{(MVE)}$ as the confidence measure $232_1$ on the signal line $233_1$ to the normalizer 240. The normalizer 240 normalizes the various implemented confidence measures $230_1$–$230_j$ and $232_1$–$232_m$ based on their dynamic range and outputs the normalized confidence measures on the signal lines $241_1$–$241_j$ and $243_1$–$243_m$ to an integrator 250.

Because, as shown in FIG. 6, the decision boundaries between the correctly recognized utterances and the erroneously recognized utterances is highly non-linear, the integrator 250 is preferably a multi-layer neural network. In particular, the integrator 250 is preferably a multi-layer perceptron (MLP), although any multi-layer neural network that can implement a non-linear function can be used as the integrator 250. The output of the integrator 250 indicates whether or not the recognized utterance should be accepted.

In the MCM subsystem 200 described above, the two confidence measures, the misverification error MVE and the misclassification error MCE, are based on likelihood ratio statistics of the recognition and verification HMMs. Both confidence measures are computed at the utterance level and are combined using an objective function implemented by the MLP that is consistently applied in both training and testing. In particular, the parameters of the MLP and the verification (and recognition) HMMs are trained using a discriminative measure that ultimately aims to minimize the verification error rate.

When an utterance O is input to the MCM subsystem 200, a sequence of confidence measures $[CM_1, CM_2, \ldots, CM_M]$ will be generated corresponding to the parameter sets $[\Lambda^{(j)}]_{j=1, \ldots}$. Then, for any class $C_i$, the output of the integrator 250 must be set such that:

$$d_i^{(MCM)} = J_\psi \{\overline{d}_i^{(j)}(O_i; \Lambda^{(j)})_{j=1\ldots M} \} \begin{cases} \geq \tau_i, & \text{if } 0 \in C_i \\ < \tau_i, & \text{otherwise} \end{cases} \quad (8)$$

where:

$J_\psi$ are the parameters associated with the integrator function J[.]; and $\{\overline{d}_i^{(j)}(O_i;\Lambda^{(j)})_{j=1 \ldots M}$ are the normalized confidence measures computed from the recognition and verification HMMs.

When combining different confidence measures based on the criteria set forth in Eq. (8), the particular implementation of the integrator 250 must be selected to best minimize the misverification error rate. As outlined above, due to the non-linear decision boundaries shown in FIG. 6, when using the misclassification error (MCE) and the misverification error (MVE) confidence measures, a multi-layer perceptron is preferably used to implement the integrator function shown in Eq. (8).

Figure 8:
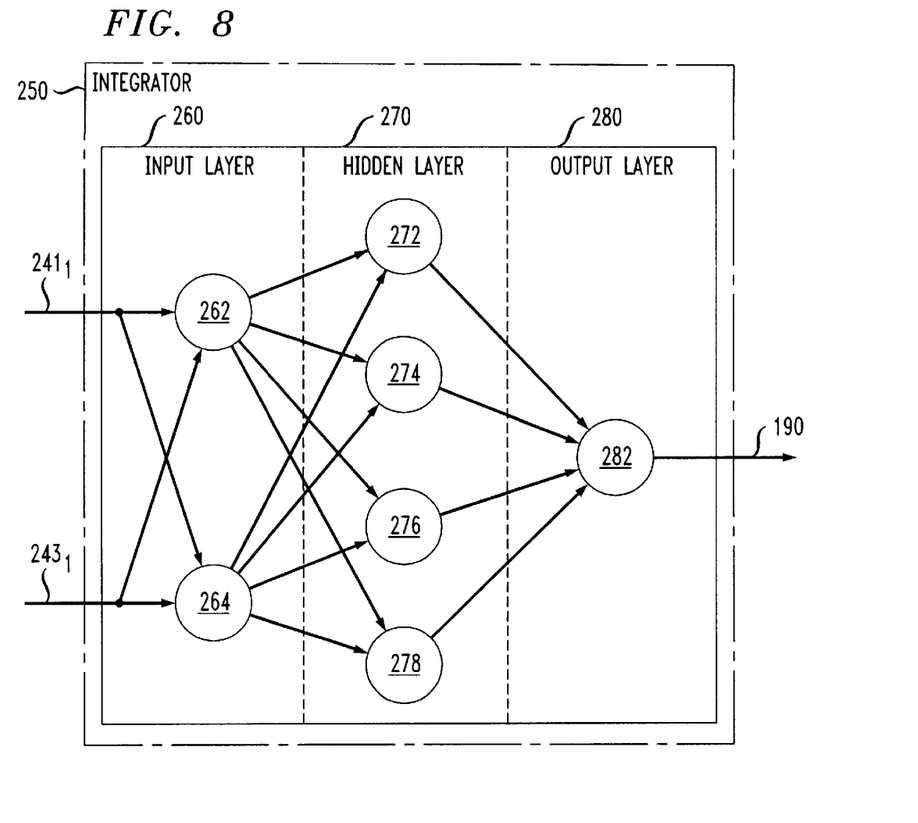
FIG. 8 is a block diagram of the integrator of the multiple confidence measures subsystem of FIG. 7.

FIG. 8 shows one preferred embodiment of the multi-layer perceptron used to implement the integrator 250. As shown in FIG. 8, the multi-layer perceptron preferably has three layers, an input layer 260, a hidden layer 270, and an output layer 280. Because the integrator 250 preferably has two inputs, one for each of the two confidence measures, MCE and MVE, preferably used in the MCM subsystem 200, the input layer 260 has two input nodes 262 and 264. Each of the signal lines $241_1$ and $243_1$ inputting the two confidence measures are input to each of the two input layer nodes 262 and 264. The outputs of each of the two input layer nodes 262 and 264 are input to each of four hidden layer nodes 272, 274, 276 and 278. The outputs of each of the four hidden layer nodes 272–278 are input to a single output layer node 282, which outputs the accept/reject decision on the signal line 190.

As set forth above, the MCM subsystem 200 is preferably designed to minimize the verification error rate. To minimize the verification error rate, both the false rejection and the false acceptance rates must be reduced. One method to achieve this is to minimize a loss function involving J[.] over all classes involved in a training set, where the loss function I is:

$$I = \sum_i [J_\psi(\overline{d}_i^{(j)}(O; \Lambda^{(j)})_{j=1\ldots M}) - T_i]^2, \quad (9)$$

where:

$$T_i = \begin{cases} 1, & \text{if } 0 \in C; \\ 0, & \text{otherwise.} \end{cases} \quad (10)$$

The loss function I is essentially a mean square error (MSE) distance which is compatible with the method for training the multi-layer perceptron. Minimizing the loss function I can, in theory, be achieved by applying gradient descent to the parameters of the multi-layer perceptron, as well as to the recognition and verification HMMs. Thus, at the $N^{th}$ iteration of the training procedure:

$$\Gamma_{n+1} = \Gamma_n - \epsilon_n (\partial I/\partial \Gamma)|_{\Gamma=\Gamma_n}, \quad (11)$$

where:

$\Gamma$ is a function of $\Lambda$ and $\Psi$;

$\epsilon_n$ is a positive learning rate; and $\partial I/\partial \Gamma$ is the gradient of I with respect to the parameters $\Gamma$.

To update the parameters of $\Psi$, standard back-propagation training is used. The update rule for $\Lambda$, on the other hand, is somewhat similar to the above-outlined procedure for adjusting the parameters of the verification HMMs using MVE training. However, in this case, the multi-layer perceptron is used as an integrator in place of the sigmoid activation function. Therefore, the HMM parameters $\Lambda^{(j)}$ can be updated by:

$$(\partial I/\partial \Lambda^{(j)}) = \sum_i [(\partial I/\partial \overline{d}_i^{(j)}) \cdot (\partial \overline{d}_i^{(j)}/\partial \Lambda^{(j)})], \quad (12)$$

where $\partial I/\partial \overline{d}_i^{(j)}$ is the gradient of the loss function I with respect to the inputs to the multi-layer perceptron. It should be appreciated this is a straightforward extension to the back-propagation algorithm. Additionally, the gradients for the MCE and MVE confidence measures are outlined in the incorporated references.

Figure 9:
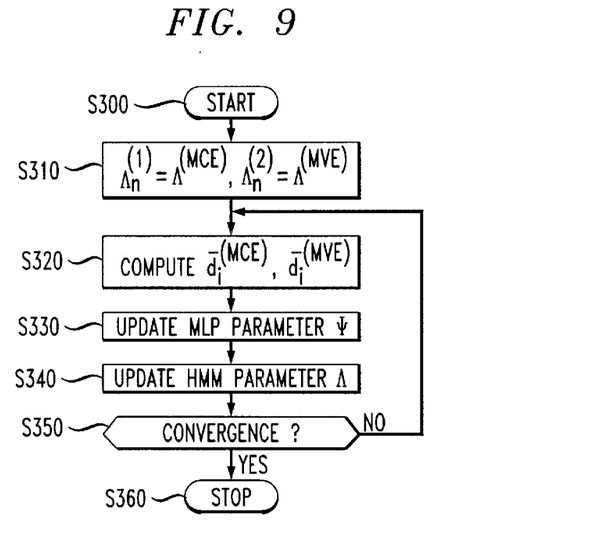
FIG. 9 is a flowchart outlining the training of the integrator of FIG. 8 and the parameters of each of the confidence measures being integrated.

FIG. 9 shows a flowchart for training the multiple confidence measures subsystem 200. Ideally, the parameters $\Lambda^{(i)}$ of the HMMs of the speech recognizer 210 and the recognition verifier 220 and the parameters $\Psi$ of the MLP integrator 250 should be updated simultaneously. However, because this implies updating the verification features as well as the verification decision boundaries at the same time, updating these parameters simultaneously commonly causes convergence problems.

Therefore, as shown in FIG. 9, an iterative scheme is adopted for updating $\Lambda$ and $\Psi$. Starting in step S300, control continues to step S310, where sets of boot-strap MCE-trained recognition HMMs and MVE-trained verification HMMs are initialized. Control then continues to step S320.

In step S320, the misclassification distance $d_i^{(MCE)}$ and the misverification distance $d_i^{(MVE)}$ are determined. In addition, in step S320, these distances are normalized based on their first order statistics. Then, control continues to step S330.

In step S330, the normalized distances are input to the MLP integrator and back-propagation training is performed to update the MLP parameters $\Psi$. Control then continues to step S340.

In step S340, the parameters $\Lambda^{(MCE)}$ and $\Lambda^{(MVE)}$ for the recognition and verification HMMs are updated using the updated MLP parameters to minimize the objective function of Eq. (9). Control then continues to step S350.

In step S350, the control system determines whether a predetermined convergence criterion has been satisfied. If the predetermined convergence criterion has not been satisfied, control returns to step S320. Otherwise, if the predetermined convergence criterion has been satisfied, control continues to step S360, where the training routine stops.

As outlined above, in the preferred embodiment, MCE trained recognition HMMs and MVE trained verification HMMs were used as the initial HMMs in the training procedure described above.

A number of experiments were conducted to confirm the utility of the above-outlined multiple confidence measures subsystem 200 that integrates multiple confidence measures in a consistent training and testing framework. The experiments were designed to identify and reject incorrectly recognized valid-digit strings, which is a much tougher problem then rejecting invalid spoken input.

A speaker-independent telephone-based connected digit database was used in the experiments. The database included 16-digit credit care numbers that were recorded using a variety of environmental conditions and telephone handsets. The database was divided into 5207 utterances used for training, and 3362 in-vocabulary utterances and 7255 out-of-vocabulary utterances used for testing. Feature analysis included computing 12 cepstral coefficients, plus energy, along with their first and second order time derivatives.

The recognition HMMs implemented in the speech recognizer 210 included 274 context-dependent subword units with 3–4 states per model, and 4 mixer components per state. The verification HMMs implemented in the recognition verifier 220 included 69 context-independent subword units, comprising 34 keyword HMMs, 34 anti-keyword HMMs, and 1 background/filler HMM. The recognition HMMs and the verification HMMs were initialized using MCE and MVE training, respectively. The integrator 250 included a three-layer MLP having two input nodes, four hidden layer nodes and one output node. The three-layer MLP was used to integrate the MCE and MVE distances set forth in Eqs. (2) and (4), respectively.

Table 1 shows the verification error rate and the average mean square error for the first four iterations on the training data.

TABLE 1

Verification performance of the
UV-MCM on the training database.

| Iteration | % Verification Error | Avg. MSE |
|---|---|---|
| 1 | 5.25 | 0.043 |
| 2 | 3.54 | 0.029 |
| 3 | 2.98 | 0.026 |

The verification error rate was determined as the false acceptance rate plus the false rejection rate. As expected, minimizing the means square error (MSE) rate reduced the verification error rate.

Table 2 shows the verification performance in terms of equal error rate (EER) and minimum error rate (MER), when evaluating the fourth iteration model on the test data.

TABLE 2

UV performance in terms of
EER and MER for various systems.

| System | EER % | MER % |
|---|---|---|
| Baseline | 30.47 | 58.99 |
| $d^{(MCE)}$ $(O;\Lambda^{(i)})$ | 12.54 | 22.89 |
| $d^{(MVE)}$ $(O;\Lambda^{(v)})$ | 17.92 | 34.33 |
| $d^{(MLP)}$ $(O;\Lambda^{(v)})$ | 12.67 | 24.61 |
| $d^{(MCM)}$ $(O;\Lambda)$ | 9.90 | 19.55 |

The baseline results refer to the performance of the verification system when using maximum likelihood estimation for training the verification models and the confidence measure $d_i^{(MVE)}$ set forth in Eq. (4) when testing. When using the MCE-training recognition models, according to Eq. (2), alone to provide the verification score consistently in both training and testing leads to the results shown in the second row of Table 2. Applying the MVE confidence measure of Eq. (4) consistently in both training and testing leads to the results shown in the third row of Table 2.

Integrating the two confidence measures, i.e., $d_i^{(MCE)}$ and $d_i^{(MVE)}$ by simply training the MLP implemented in the integrator 250 led to a minor improvement in the verification performance, as shown in the fourth row of Table 2.

Finally, using the training procedure outlined in FIG. 9, in which the both MLP and the verification models were updated by minimizing the objective function set forth in Eq. (9), led to a significant improvement in the verification performance. This is shown in the bottom row of Table 2. It should be appreciated that the difference in the performance between $d^{(MLP)}$ and $d^{(MCM)}$ shown in the fourth and fifth rows of Table 2 can be attributed to the consistent training and testing strategy outlined above.

Figure 10:
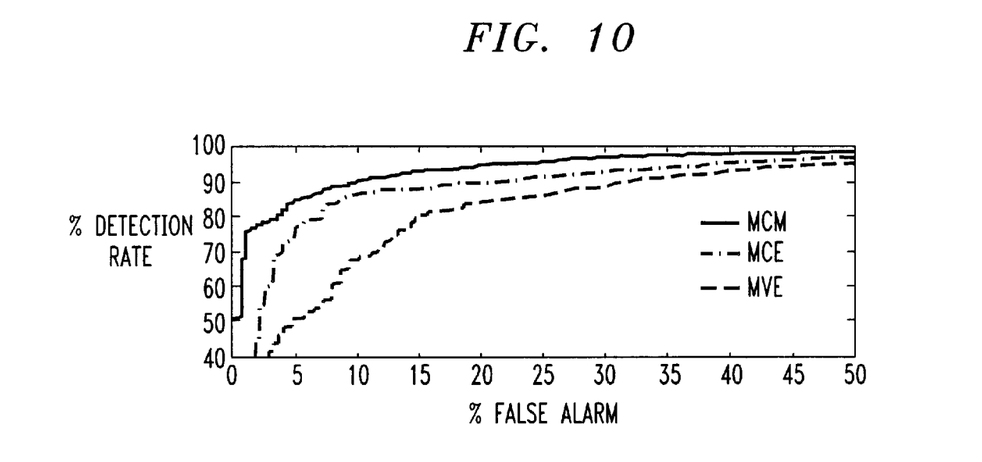
FIGS. 10 and 11 show the results of using the multiple confidence measures subsystem of FIG. 7 during input speech testing.

FIG. 10 shows the receiver operating characteristics curves. That is, FIG. 10 shows the curves plotting the false alarm rate against the detection rate for the confidence measures $d^{(\overline{MVE})}$, $d^{(MCE)}$ and $d^{(MCM)}$.

Figure 11:
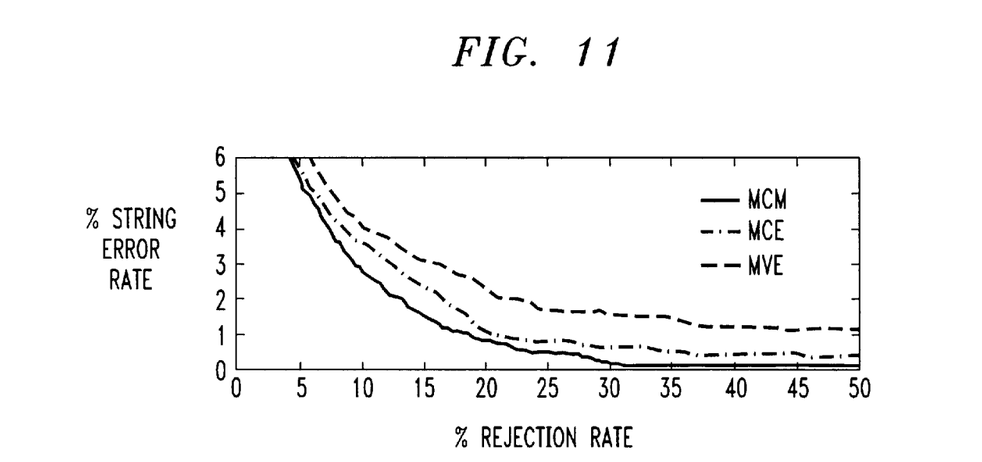

FIG. 11 shows a plot of the rejection rate versus the string error rate for these three measures. From the graphs shown in FIGS. 10 and 11, the multiple confidence measures subsystem 200 provides clear additional benefit in verification performance over using either MVE or MCE alone. Furthermore, this improvement is rather substantial considering that only valid strings were tested.

The automated speech recognition system 100, in general, and the multiple confidence measurements subsystem 200, in particular, are preferably implemented on a programmed general purpose computer. However, the automated speech recognition system 100 and/or the multiple confidence measurements subsystem 200 can also be implemented on a special purpose computer, a programmed microprocessor or microcontroller with or without peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which finite state machine(s) capable of implementing the recognition HMMs, the verification HMMs and the MLP can be used to implement the automated speech recognition system 100 and/or the multiple confidence measurements subsystem 200 of this invention.

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An automated speech recognition system comprising:
   a plurality of confidence measurement generating devices that generate a plurality of confidence measurements, at least one of the plurality of confidence measurements being a first type of confidence measurement and at least one of the plurality of confidence measurements being a second type of confidence measurement, where the first and second types of confidence measurements are different types of confidence measurements, the first and second types of confidence measurements corresponding to separate knowledge sources, wherein:
   the automated speech recognition system inputs a signal representing an utterance to be recognized, the signal comprising at least one portion, and
   each confidence measurement generating device inputs that signal and outputs at least one confidence measurement of at least one of at least the first and second types of confidence measurements for each portion of that signal;
   a normalizing device that inputs the plurality of confidence measurements comprising at least the first and second types of confidence measurements and outputs a plurality of normalized confidence measurements of at least the first and second types for each portion of the utterance; and
   an integrator that inputs, for each portion of the utterance, the plurality of normalized confidence measurements of at least the first and second types and outputs, based on the plurality of normalized confidence measurements of at least the first and second types for that portion of the utterance, a signal indicating whether that portion of the utterance has been correctly recognized.

2. The automated speech recognition system of claim 1, wherein the integrator is a multi-layer neural network.

3. The automated speech recognition system of claim 2, wherein the multi-layer neural network is a multi-layer perceptron.

4. The automated speech recognition system of claim 3, wherein the multi-layer perceptron comprises:
   a first layer having a number n of nodes equal to a number n of the plurality of normalized confidence measurements, each first layer node inputting the n normalized confidence measurements;
   at least one hidden layer, each hidden layer having at least one node, each node of a first hidden layer connected to the n first layer nodes, the nodes of each next hidden layer connected to the nodes of the preceding hidden layer; and
   an output layer having a single node connected to each node of a last hidden layer.

5. The automated speech recognition system of claim 4, wherein the at least one hidden layer of the multi-layer perceptron comprises a single layer acting as both the first hidden layer and the last hidden layer.

6. The automated speech recognition system of claim 3, wherein the multi-layer perceptron comprises:
   a first layer having a number n of nodes equal to a number n of the plurality of normalized confidence measurements, each first layer node inputting the n normalized confidence measurements;
   a second layer having a number m of nodes, each second layer node connected to the n first layer nodes; and
   a third layer having a single node connected to each of the m second layer nodes.

7. The automated speech recognition system of claim 1, wherein the normalizer normalizes each of the plurality of confidence measurements by a confidence measurement statistic to generate the normalized confidence measurements.

8. The automated speech recognition system of claim 1, wherein the plurality of confidence measurement generating devices comprises:
   a speech recognizer, wherein the signal input by the speech recognizer comprises a spectral coefficient signal including a plurality of spectral coefficients determined from the portion of the utterance, the speech recognizer outputting, for the portion of the utterance, a recognition hypothesis and at least a minimum characterization error confidence measurement for the hypothesis; and
   a recognition verifier, wherein the signal input by the recognition verifier comprises at least the recognition hypothesis output by the speech recognizer, the recognition verifier outputting, for the portion of the speech, at least a minimum verification error confidence measurement for the recognition hypothesis.

9. The automated speech recognition system of claim 1, wherein each confidence measurement generating device contains knowledge about the recognition task performed by the automated speech recognition system.

10. The automated speech recognition system of claim 1, wherein:
    each confidence measurement corresponds to a quality of a recognition function performed by the corresponding confidence measurement generating device on the portion of the utterance, each recognition function having a set of parameters; and during a training phase, the signal output by the integrator is input to the plurality of confidence measurement generating devices, each confidence measurement generating device modifying the set of parameters of its recognition function based on the signal.

11. A method for automatically recognizing speech, comprising:

inputting a signal based on an utterance to be recognized, the signal having a plurality of portions;

generating a proposed recognition for each portion;

generating for each portion of the signal, a plurality of confidence measurements from the proposed recognition for that portion of the signal, comprising:
  generating at least one confidence measurement of a first type, and
  generating at least one confidence measurement of a second type,
  wherein at least the first and second types of confidence measurements are different types of confidence measurements that correspond to separate knowledge sources and the at least first and second types of confidence measurements are generated in parallel relative to the signal;

normalizing, for each portion of the signal, the plurality of confidence measurements, comprising at least the first and second types of confidence measurements, for that portion of the signal;

integrating, for each portion of the signal, the plurality of normalized confidence measurements of at least the first and second types to generate an integrated confidence measurement for that portion of the signal; and determining, for each portion of the signal, if the proposed recognition for that portion of the signal is acceptable based on the integrated confidence measurements of at least the first and second types.

12. The method of claim 11, wherein generating the proposed recognition for each portion comprises generating a recognition hypothesis for each portion.

13. The method of claim 12, wherein generating, for each portion of the signal, the first type of confidence measurements comprises generating at least a minimum characterization error type of confidence measurement based on the recognition hypothesis.

14. The method of claim 13, wherein generating, for each portion of the signal, the second type of confidence measurements comprises
  generating at least one alternative recognition hypothesis for that portion of the signal; and
  generating at least a minimum verification error type of confidence measurement based on the recognition hypothesis and the at least one alternative recognition hypothesis.

15. The method of claim 11, wherein normalizing the plurality of confidence measurements for each portion comprises computing at least one confidence measurement statistic to generate the normalized confidence measurements.

16. The method of claim 15, further comprising dynamically determining the range of the plurality of confidence measurements.

17. The method of claim 11, wherein integrating the plurality of normalized confidence measurements comprises inputting the plurality of normalized confidence measurements into a multi-layer perceptron.

18. The method of claim 11, wherein integrating the plurality of normalized confidence measurements comprises inputting the plurality of normalized confidence measurements into a multi-layer neural network.

19. The method of claim 11, wherein integrating the plurality of normalized confidence measurements comprises:
  inputting the plurality of normalized confidence measurements into a first layer of a multi-layer perceptron, the first layer having a number n of nodes equal to a number n of the plurality of normalized confidence measurements, each first layer node inputting the n normalized confidence measurements and generating a first layer output signal;
  inputting the n first layer output signals into a first one of a plurality of hidden layers of the multi-layer perceptron, each hidden layer having an arbitrary number of nodes, each next hidden layer connected to a preceding hidden layer, a last hidden layer outputting m hidden layer output signals; and
  inputting the m hidden layer output signals into an output layer having a single node, the single node inputting the m hidden layer nodes and outputting an acceptance signal indicating if the proposed recognition is acceptable.

20. The method of claim 11, wherein integrating the plurality of normalized confidence measurements comprises:
  inputting the plurality of normalized confidence measurements into a first layer of a multi-layer perceptron, the first layer having a number n of nodes equal to a number n of the plurality of normalized confidence measurements, each first layer node inputting the n normalized confidence measurements and generating a first layer output signal;
  inputting the n first layer output signals into a second layer of a multi-layer perceptron, the second layer having a number m of nodes, each second layer node inputting the n first layer nodes and outputting a second layer output signal; and
  inputting the m second layer output signals into a third layer having a single node, the single node inputting the m second layer signals and outputting an acceptance signal indicating if the proposed recognition is acceptable.

21. The method of claim 11, wherein generating the plurality of confidence measurements comprises generating the plurality of confidence measurements from the proposed recognition based on a plurality of sets of parameters, the method further comprising, during a training phase, modifying for each portion, at least one of the plurality of sets of parameters based on a correctness of the proposed recognition.

22. An automated speech recognition system comprising:
  a plurality of confidence measurement generating devices, each confidence measurement generating device inputting a signal based on a portion of an utterance to be recognized and outputting at least one confidence measurement for the portion of the utterance, each confidence measurement corresponding to a quality of a recognition function performed by the corresponding confidence measurement generating device on the portion of the utterance, each recognition function having a set of parameter, the plurality of confidence measurement generating devices comprising:
    a speech recognizer, wherein the signal input by the speech recognizer comprises a spectral coefficient signal including a plurality of spectral coefficients determined from the portion of the utterance, the speech recognizer outputting, for the portion of the utterance, a recognition hypothesis and at least a minimum characterization error confidence measurement for the hypothesis, and a recognition verifier, wherein the signal input by the recognition verifier comprises at least the recognition hypothesis output by the speech recognizer, the recognition verifier outputting, for the portion of the speech, at least a minimum verification error confidence measurement for the recognition hypothesis;

a normalizing device that inputs the plurality of confidence measurements from both the speech recognizer and the recognition verifier and outputs a plurality of normalized confidence measurements; and an integrator that inputs the plurality of normalized confidence measurements of both the speech recognizer and the recognition verifier and outputs a signal indicating whether the portion of the utterance has been correctly recognized, wherein, during a training phase, the signal output by the integrator is input to the plurality of confidence measurement generating devices, each confidence measurement generating device modifying the set of parameters of its recognition function based on the signal.

23. A method for automatically recognizing speech, comprising:

inputting a signal based on an utterance to be recognized, the signal having a plurality of portions;

generating a proposed recognition for each portion, comprising generating a recognition hypothesis for each portion;

generating, for each portion of the signal, a plurality of distinct confidence measurements from the proposed recognition based on a plurality of sets of parameters;

normalizing the plurality of distinct confidence measurements for each portion;

integrating the plurality of normalized distinct confidence measurements to determine, for each portion, if the proposed recognition is acceptable; and during a training phase, modifying, for each portion, at least one of the plurality of sets of parameters based on a correctness of the proposed recognition;

wherein generating, for each portion of the signal, the plurality of distinct confidence measurements comprises:

generating at least a minimum characterization error confidence measurement based on the recognition hypothesis, generating at least one alternative recognition hypothesis for the recognition hypothesis, and generating at least a minimum verification error confidence measurement based on the recognition hypothesis and the at least one alternative recognition hypothesis.

* * * * *